United States Patent [19]

Ohkubo

[11] Patent Number: 4,885,037

[45] Date of Patent: Dec. 5, 1989

[54] METHOD FOR PRODUCING ARTICLE INCLUDING PRESS-DRIED PLANT

[75] Inventor: Takemi Ohkubo, Fukuoka, Japan

[73] Assignee: Esu-Oh Giken Co., Ltd., Fukuoka, Japan

[21] Appl. No.: 201,090

[22] Filed: Jun. 1, 1988

[51] Int. Cl.[4] .............................................. A01N 3/00

[52] U.S. Cl. .......................................... 156/57; 427/4; 428/13; 428/22; 428/24; 428/542.4

[58] Field of Search ................ 156/57; 427/4; 428/13, 428/17, 22, 24, 542.4

[56] References Cited

U.S. PATENT DOCUMENTS

| | | | |
|---|---|---|---|
| 417,284 | 12/1889 | Reinherz | 156/57 |
| 472,980 | 4/1892 | Brown | 156/57 X |
| 1,084,858 | 1/1914 | Heeren | 156/57 |
| 1,949,268 | 2/1934 | Clark | 156/57 |
| 2,105,688 | 1/1938 | Fessenden | 156/57 X |
| 2,707,352 | 5/1955 | Fischer | 428/22 X |
| 3,607,488 | 9/1971 | Yordan | 156/57 |
| 3,718,529 | 2/1923 | Coleman et al. . | |
| 3,835,550 | 9/1974 | Kaneko . | |
| 4,418,497 | 12/1983 | Mastriano . | |

FOREIGN PATENT DOCUMENTS

| | | |
|---|---|---|
| 2248308 | 5/1975 | France . |
| 2585630 | 2/1987 | France . |
| 39-23934 | 10/1964 | Japan . |
| 48-35107 | 5/1973 | Japan . |
| 53-102129 | 9/1978 | Japan . |
| 1505748 | 3/1978 | United Kingdom . |

OTHER PUBLICATIONS

Patent Abstracts of Japan, vol. 11, No. 38 (c-401) [2485], 4th Feb., 1987; & JP-A-61 204 101 (Yayoi Nakase) 10-09-1986 Abstract.

*Primary Examiner*—Dawson, Robert A.
*Attorney, Agent, or Firm*—Michael N. Meller

[57] ABSTRACT

A novel method for producing an article such as a postcard, bookmark or label including a press-dried plant such as a flower is disclosed. The method comprises the steps of interposing a picked plant between two flexible sheets impregnated with a desiccating agent or between one of the flexible sheets and a cushioning sheet; drying the plant under a pressure in a drying atmosphere; hermetically storing the dried plant in a bag of a gas barrier material, the bag containing a desiccating agent and an oxygen absorbing agent; removing the plant from the bag shortly before producing the article carrying the press-dried plant; placing the plant on a surface of a substrate, and; forming a transparent or translucent overlayer over the plant so that air does not remain between the overlayer and the surface of the substrate.

The article produced according to the present invention can maintain a color or pattern of the press-dried plant in a state similar to that of a living plant without discoloration, for a long period of time.

23 Claims, 10 Drawing Sheets

METHOD FOR PRODUCING ARTICLE INCLUDING PRESS-DRIED PLANT

BACKGROUND OF THE INVENTION

1. Field of the Invention

The present invention relates to a method for producing an article including a press-dried plant, and the article produced thereby. More particularly, the present invention relates to a method for producing such an article comprising rapidly drying a picked plant such as a flower and adhering the dried plant on a surface of a card, a sheet, general household ware, furniture or the like while maintaining a shape, color or profile similar to those of the living plant, whereby the dried plant can be stored without discoloration for a long period of time.

An article including a press-dried plant (referred to as "press-dried plant article" hereinafter) can be widely applied in the design of, for example, a label, card, bookmark, postcard, cover of a postal folder, furniture, tableware, clothes, interior decoration, or the like, by adhering the article including the press-dried plant thereon. The press-dried plant article according to the present invention may be a new kind of article per se, or be an article having an additional value with respect to design and inherent function.

2. Description of the Related Art

A conventional method for producing a press-dried plant generally comprises placing a plant between sheets of paper or fabric, and pressing same. A dehydrating agent such as silica gel may be disposed under the sheet of paper or fabric.

Next, the thus dried plant is quickly placed on the surface of a card or sheet, so that discoloration of the plant does not occur, and thereafter, a self-adhesive tape is applied to adhere the plant to the card and thus form a product.

In addition, a table cover or a framed decoration can be produced by placing the dried plant on a cushion sheet and covering it with a rigid plastic sheet or glass plate thereon to fix the dried plant therebetween.

In the conventional methods wherein only paper or fabric is used, or silica gel is disposed under the paper or fabric, the dehydration efficiency is relatively low, or the dehydration is time-consuming because of the plant is not close enough to the silica gel. Therefore, discoloration often occurs during the fabrication process, or while the press-dried plant is in the product, in a relatively short period of time.

Further, in the fabrication step of the conventional method, the dried plant must be promptly placed on the article to be decorated and covered with the self-adhesive tape, and the time from the end of the drying step to the adhering step must be short. Even if the plant is dried with a desiccating agent, decoloration proceeds due to oxygen in the air when the dried plant is stored for several months. Therefore, a flower picked at the optimum flowering time must be processed into the product within a few days after drying.

In general, although many plants are collected in the spring when a large variety of plants are in bloom, few are collected in the winter, and thus the amount of products varies considerably according to the season. It is difficult to process all of the plants collected in the spring, and thus the ratio of plants picked to products produced is relatively low.

Further, if the dried plant is fixed on the surface of the sheet, card or the like by covering with a self-adhesive tape, air remains around the plant between the surface of the sheet and the tape, and thus the shape or pattern of the plant is distorted, and the reflection or refraction of light imparts an unnatural look to and detracts from the beauty of the plant. In addition, a problem arises in that the remaining air causes decoloration of the dried plant. In a table cover or framed decoration produced by placing the dried plant on a cushioning sheet and covering it with rigid plastic or glass plate, a solid (three-dimensional) look due to the delicate irregularity of the plant is spoiled and the aesthetic value thereof is low, and thus such applications are limited.

SUMMARY OF THE INVENTION

The object of the present invention is to solve the problems in the conventional methods for producing a press-dried plant article, and the article produced thereby by, first, providing a method which is capable of producing an article including the press-dried plant in a state having a color and shape similar to those of a living plant and maintaining such a state for a long period of time, and the article produced by that method.

Second, the object of the present invention is to make it possible to store the dried plant for a long period of time, manufacture and ship the product of the dried plant independently at the time of flowering or collecting of the plants, and increase the ratio of the picked plants to the product. Therefore, according to the present invention, the commercial value of the press-dried plant can be considerably increased.

In accordance with the present invention, there is provided a method for producing an article including a press-dried plant comprising the steps of interposing a picked plant such as a flower between two flexible sheets impregnated with a desiccating agent, particularly a strong desiccating agent, such as anhydrous magnesium sulfate, anhydrous calcium chloride or a mixture thereof, or between one of said flexible sheets and a cushioning sheet;

drying the plant under pressure in a drying atmosphere, such as in a room or a chamber, and optionally under heating;

hermetically storing the thoroughly dried plant in a bag of a gas barrier material, the bag containing a desiccating agent, particularly a strong desiccating agent, such as the agents mentioned above, and an oxygen absorbing agent such as an iron powder;

removing the plant from the bag shortly before producing the article carrying the press-dried plant;

placing the plant on a surface of a substrate, and;

forming a transparent or translucent overcoat layer over the plant so that air does not remain between the covering layer and the surface of the substrate.

The present invention further provides a method for producing a label including a press-dried plant comprising the steps of interposing a picked plant between two flexible sheets impregnated with a desiccating agent or between one of said flexible sheets and a cushioning sheet;

drying the plant under pressure in a drying atmosphere;

hermetically storing the thoroughly dried plant in a bag of a gas barrier material, the bag containing a desiccating agent and an oxygen absorbing agent;

removing the plant from the bag, shortly before producing the label carrying the press-dried plant;

placing the plant on a surface of a first self-adhesive film which has been adhered on a surface of a temporary carrier, such as a release sheet, or a third transparent or translucent sheet;

covering the plant with a transparent or translucent second self-adhesive film;

applying pressure to bond the second film to the first film so that air does not remain therebetween, and;

cutting the first and second films to form a closed slit surrounding the plant.

Furthermore, the present invention relates to the articles produced by said methods, such as a postcard, bookmark, postal folder or label including the press-dried plant.

DESCRIPTION OF THE PREFERRED EMBODIMENTS

Figure 1:
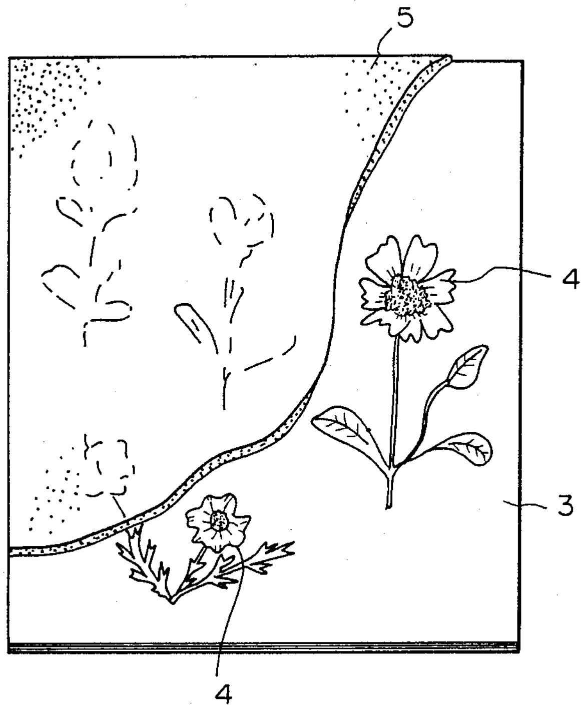
FIG. 1 is a partially cut away plan view illustrating the stage wherein the plant is interposed between the desiccating sheet and the cushioning sheet according to the present invention as shown in Example 1.

The method for producing the press-dried plant article according to the present invention comprises the steps of (i) drying the picked plant, (ii) storing the dried plant, and (iii) fabricating the article by removing the plant from storage and adhering it to the surface of the sheet, card or the like.

These steps will be explained hereinafter.

Drying Step

The plant such as a flower is placed on the flexible desiccating sheet (such as paper, fabric, or the like) impregnated with the desiccating agent, preferably, a strong desiccating agent, and then is covered with a flexible desiccating sheet or the cushioning sheet of cardboard, fabric, urethane mattress or the like to form a desiccating unit. Many desiccating units are stacked to form a laminated piece and pressed from outside in a room or chamber.

When the laminated piece is pressed from the outside, the desiccating sheet impregnated with the desiccating agent is deformed and brought into intimate contact with the surface of the plant, and thus the desiccating agent is brought close to the plant, whereby the drying efficiency is enhanced and the drying time decreased.

The drying procedure may be performed by using the desiccating agent alone, or in combination with heating by a heating element using an electric heater or the like. In the latter case, one or more heating elements are disposed on the uppermost laminated piece, under the bottom piece and/or between the pieces. When the heating elements are operated simultaneously, the drying is quickly effected, and the drying time reduced to $\frac{1}{3}$ to $\frac{2}{3}$ that necessary when only the desiccating agent is used.

The strong desiccating agent with which the desiccating sheet is impregnated includes anhydrous magnesium sulfate, anhydrous calcium chloride, lithium chloride, or the like.

The drying step of the conventional method using silica gel takes 7–10 days, but the drying step of the present invention can be reduced to 3–4 days when using the desiccating agent without heating, and to 1–2 days when with heated by the heating element.

The pressing means used in the drying step is generally a cylinder, a pressing machine or a simple pressure by weight. A heavy pressure is not necessary.

The drying step is carried out in a dry atmosphere, such as in a room or chamber having a relative humidity of about 40% or less.

Storing Step

The dried plant obtained by the above drying step is stored in a gas barrier bag containing a desiccating agent and an oxygen absorbing agent. As the desiccating agent, the above-mentioned anhydrous magnesium sulfate, lithium chloride, anhydrous calcium chloride, or the like may be used. Iron powder is generally used as the oxygen absorbing agent.

The desiccating agent maintains or enhances the dried state of the dried plant and the oxygen absorbing agent prevents discoloration of the dried plant due to oxygen in the bag. According to the storing step of the present invention, the brightness of the natural color of the plant can be maintained for 3 to 4 years, when the dried plant is stored in a dark room. Therefore, the following fabricating step may be carried out at any desired time and for any desired number of products.

Fabricating Step

The press-dried plant is removed from the gas barrier bag only when the article is to be manufactured.

The dried plant is carefully picked up with a forceps or the like and placed on the surface of a substrate such as a sheet, card, general household ware, or the like. The transparent or translucent film, the underside of which has been coated with an adhesive such as a pressure sensitive adhesive, is covered over and closely adhered to the plant and the surface of the substrate under pressure or hot pressing so that air does not remain between the surface of the substrate and the film or the plant. As the method for closely adhering the film, there may be mentioned a method for adhering under a pressure a transparent or translucent film having an adhesive such as a pressure sensitive adhesive coated thereon, or a method for welding, under heating, the resin film and the surface of the card, sheet or the like and at the same time removing the gas permeability thereof and imparting a gas barrier property thereto.

Because the air is removed and the film is intimately adhered, the refraction or reflection due to the air layer is eliminated, and thus the shape, pattern or color of the plant is shown correctly and three dimensionally without interference by the film. Further, because of the absence of air, the dried plant is not oxidized, does not absorb moisture, and will not be discolored over a long period of time.

In order to enhance the close adhesion of the transparent or translucent film and completely remove the air layer, the adhering step of the transparent or translucent film should be carried out in a vacuum chamber.

As another method for adhering the transparent or translucent film, the transparent or translucent plastic resin may be coated or dripped on the plant placed on the surface of the substrate to cover and fix the plant with the resin. This method also reduces discoloration of the plant.

If the press-dried plant article produced is sealed in a moisture-resistant, transparent envelope together with a desiccating agent, at the end of the fabricating step, before marketing, discoloration can be further reduced during sales distribution by not breaking the envelope before using the article. Furthermore, discoloration can be reduced if the desiccating agent and the oxygen absorbing agent are contained in the card including the press-dried plant together with breathing holes.

If the combination of a film and paper, or two films which are adhered to each other with a pressure-sensitive adhesive is employed as the substrate, the label including the press-dried plant sandwiched between two films can be used by releasing same from the above-mentioned paper or the underlying film. In this case, a small label can be used by releasing only a part of such an article if a closed slit surrounding the plant is cut through the upper two films.

EXAMPLES

The present invention now will be further illustrated by, but is by no means limited to, the following Examples.

Example 1

As shown in FIGS. 1 to 12, this Example illustrates the present method for producing the press-dried plant wherein a plant is dried under heating and sealed under pressure with a transparent and self-adhesive film. Further, the present Example illustrates the article of the press-dried plant produced thereby.

In this Example, the steps of drying and storing are carried out in a drying room provided with a dehumidifier.

Drying step

Figure 2:
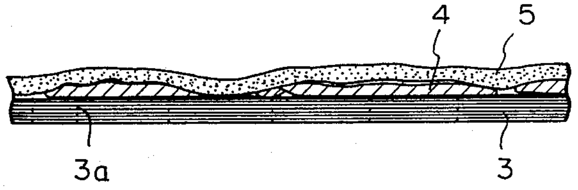
FIG. 2 is a sectional view of FIG. 1.
Figure 3:
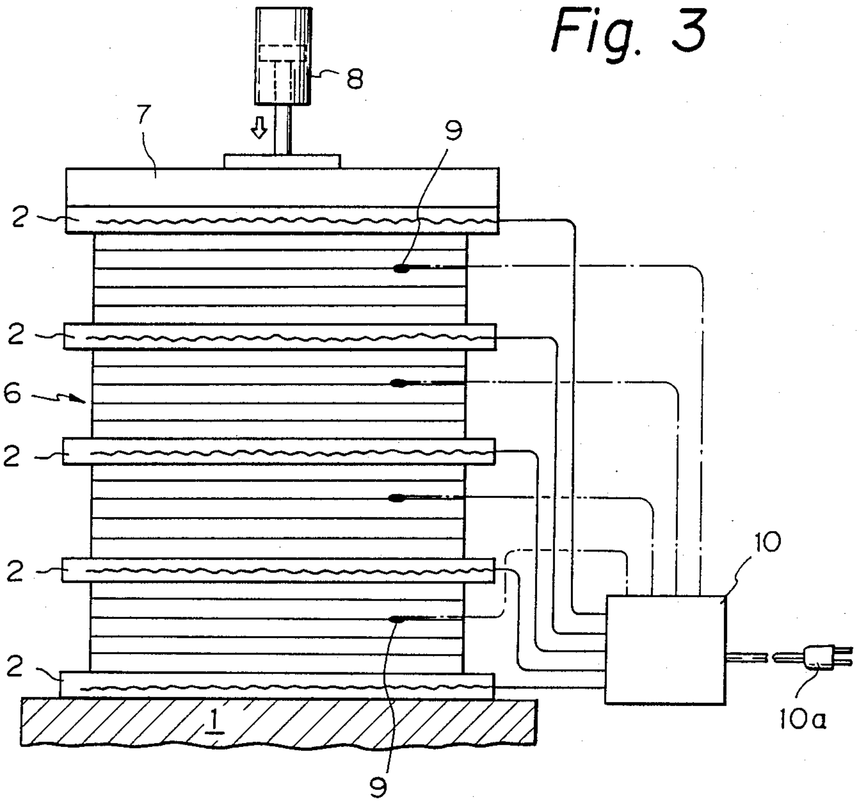
FIG. 3 is a schematic sectional view illustrating the drying step of the present invention.

On a base 1, an electric heating planar element 2 (100 cm×70 cm) of about 30 W is mounted. A plant 4 is placed on a desiccating sheet 3 with a thickness of about 5 mm, which has been prepared by stitching by thread 3*a*, a number of thin sheets of paper (90 cm×65 cm) impregnated with anhydrous magnesium sulfate or anhydrous calcium chloride, and then covered with a cushioning sheet 5 of urethane foam mattress (about 2 mm) to form a desiccating unit. Reference is made to FIGS. 1 to 3.

About twenty units are stacked to form a laminated piece 6, and the laminated pieces 6 are then mounted on the above planar element 2, with a similar electric heating planar element 2 placed on every five pieces 6 and on the uppermost piece 6. Further, a press plate 7 is mounted thereon and a force of 40 kg is exerted via a cylinder 8 to press the whole. A temperature is monitored by temperature sensors 9 inserted in the laminated pieces, and controlled by a temperature controller 10 which is connected to a current source 10*a* (see FIG. 3). The temperature is maintained at about 35° to 70° C. The plant was maintained for 1 or 2 days under the above conditions, and was seen to be thoroughly dried.

Storing step

The plant 4 which has been thoroughly dried is carefully taken from the laminated piece 6 by forceps or the like and placed on a mount 11. The whole is placed in a transparent bag 12 of a gas barrier material, which bag contains a small bag 13 containing anhydrous magnesium sulfate or anhydrous calcium chloride and a small bag 14 containing an oxygen absorbing agent. The bag 12 is then sealed and stored in a dark room (see FIG. 4).

Fabricating step

Figure 4:
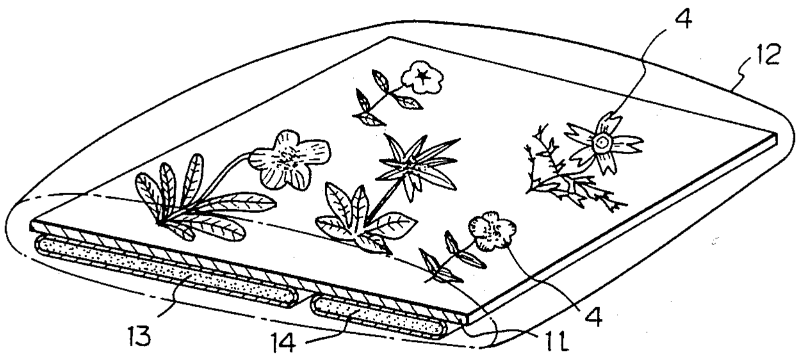
FIG. 4 is a perspective view illustrating the storing step of the present invention.

When an article is to be produced, the gas barrier bag 12 as shown in FIG. 4 is broken, and the dried plant 4 is removed therefrom.

Figure 5:
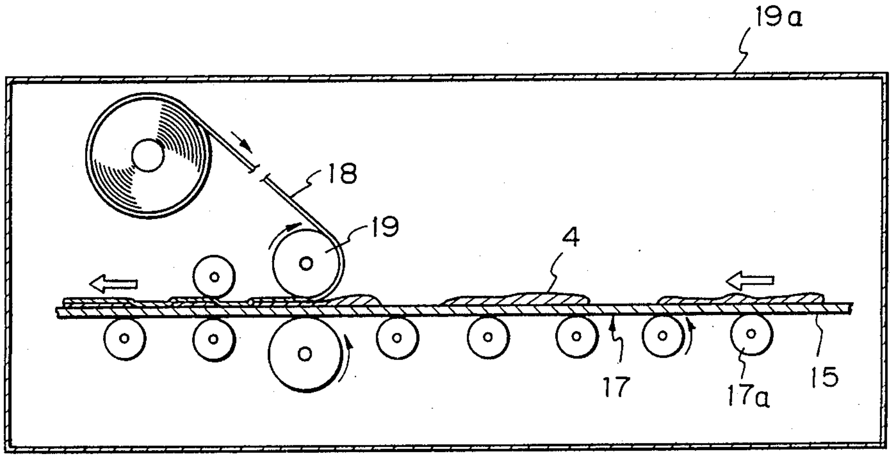
FIG. 5 is a schematic sectional view illustrating the fabricating step wherein the transparent self-adhesive film is applied according to the present invention.

The dried plant 4 taken out is arranged at a desired position on a card or a sheet 15 to form a desired pattern. The card or sheet 15 is then moved along a horizontal conveying path 17 formed by rollers 17*a*, and a gas-barrier, self-adhesive transparent polypropylene resin film 18 is placed thereon and the whole rolled in a pressure rubber roll 19, which adheres the self-adhesive transparent film 18 to the dried plant 4 mounted on the card or sheet, applies a pressure thereon to remove air in one direction, and closely adheres the self-adhesive transparent film 18 to the dried plant 4 and the card or sheet with the pressure sensitive adhesive coated on the underside of the film 18, so that air does not remain therein (see FIG. 5). The apparatus shown in FIG. 5 is surrounded by a casing 19*a*.

After adhering the self-adhesive transparent film 18, the card or sheet is cut to a desired size or shape.

Figure 6:
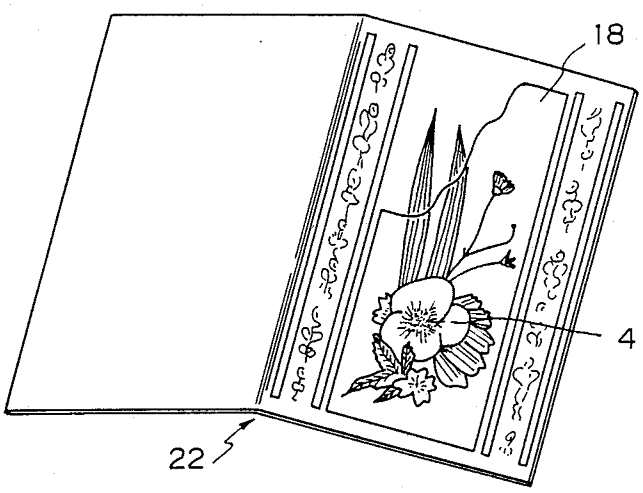
FIGS. 6 to 12 illustrate the press-dried plant articles produced according to the present invention as shown in Example 1.
Figure 7:
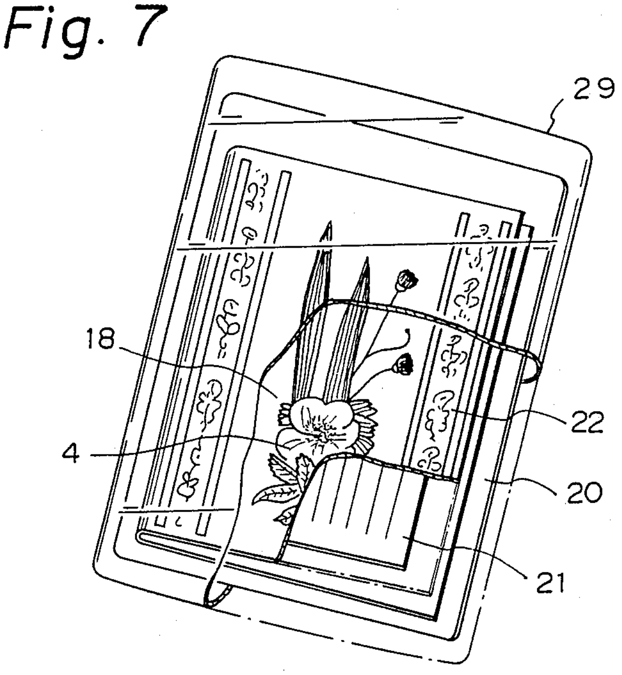

Typical examples of the products are shown in FIGS. 6–12. The press-dried plant article illustrated in FIGS. 6 and 7 is a double-leaf-folded postal folder carrying the press-dried plant on a surface of the front cover 22 thereof. This postal folder contains notepaper 21 therebetween and is sealed in a postal envelope 20. After writing thereon, the notepaper 21 is put between the folder 22, sealed into the envelope 20, and mailed. The addressee can then enjoy the press-dried plant on the front cover sheet after opening the envelope.

Figure 8:
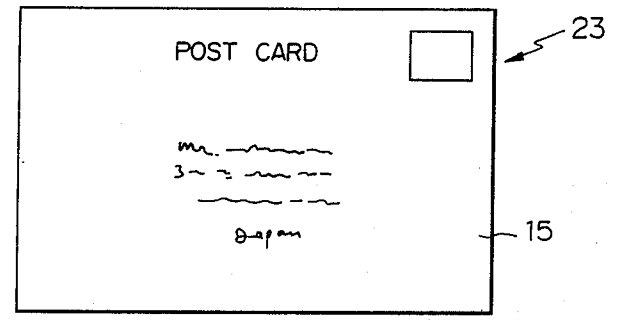
Figure 9:
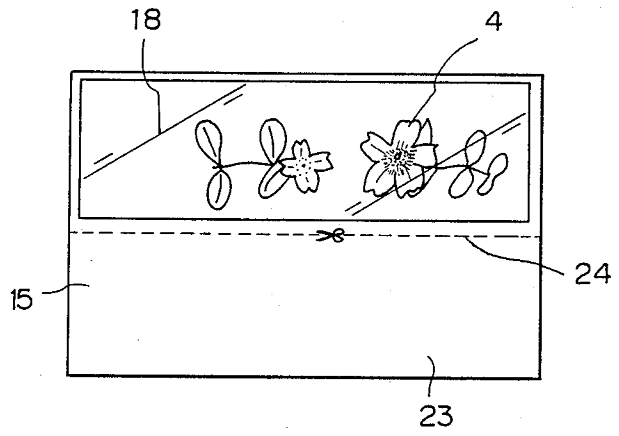

The press-dried plant article illustrated in FIGS. 8 and 9 is a postcard 23 carrying the press-dried plant. The press-dried plant is applied according to the present invention on a half portion of the side used for a message. An indicating line 24 for cutting is printed in the center thereof, and half thereof can be used as a bookmark.

Figure 10:
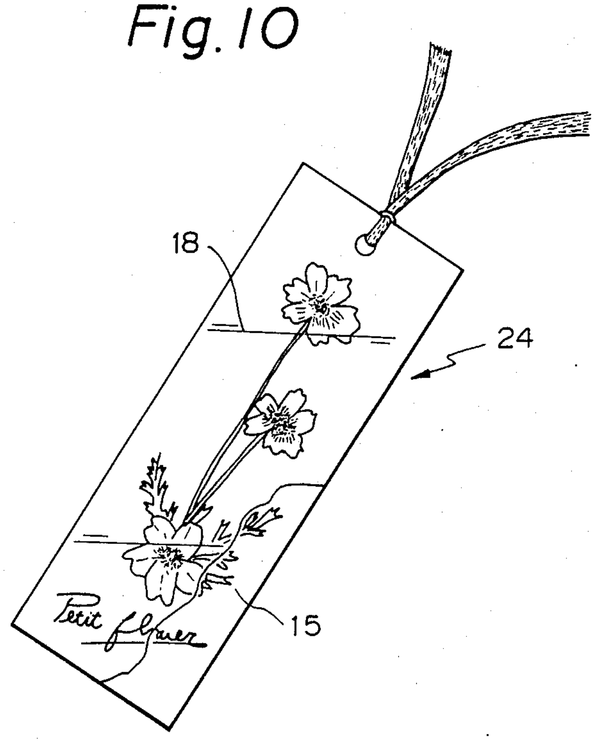

The press-dried plant article illustrated in FIG. 10 is a bookmark 24 carrying on one side thereof the press-dried plant applied according to the present invention.

Figure 12:
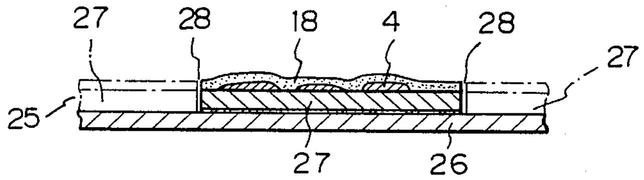
Figure 11:
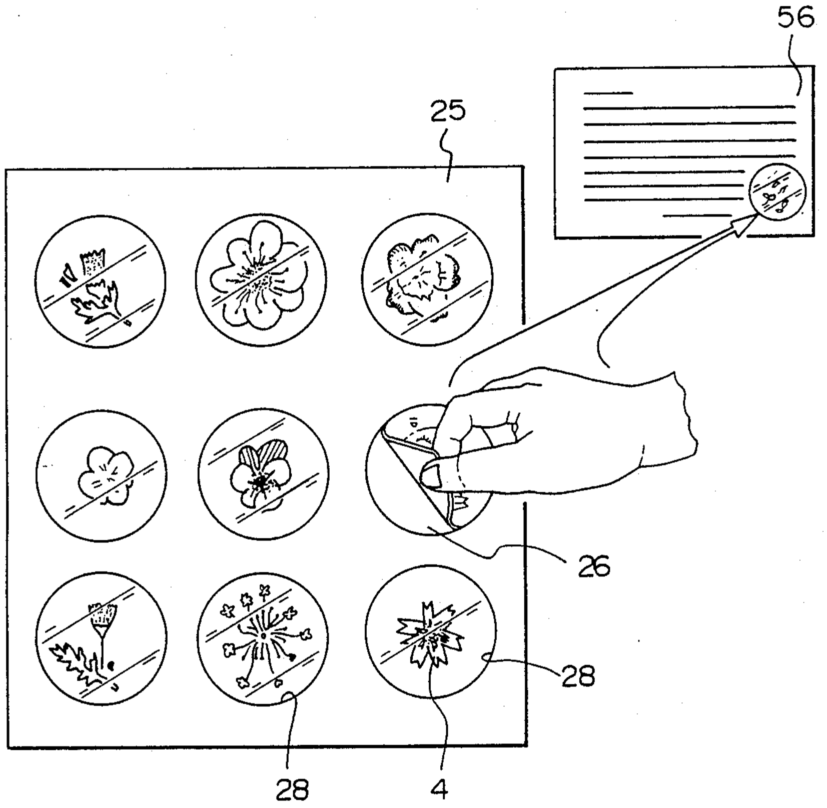

The press-dried plant article illustrated in FIGS. 11 and 12 is an example of a label 25, which is produced by placing the dried plant 4 on a sheet which has been manufactured by adhering a self-adhesive paper 27 to a release paper 26, covering a transparent self-adhesive film 18 using a strong pressure sensitive adhesive, and adhering same under a pressure according to the present invention, and further providing slits 28 by annularly cutting portions including the plants at the center from the transparent self-adhesive film 18 to the self-adhesive paper 27 up to the release paper 26 with a press edge.

Upon use, the label comprising the self-adhesive paper 27 and the transparent self-adhesive film 18 is removed from the release paper 26 along the slit 28, and readily adhered to the notepaper 56, a sealing site on an envelope, or a desired portion of general household ware or the like, by the pressure sensitive adhesive coated on the underside.

Each of the press-dried plant articles as above is stored in the gas barrier bag 29 containing the desiccating agent.

Example 2

Figure 13:
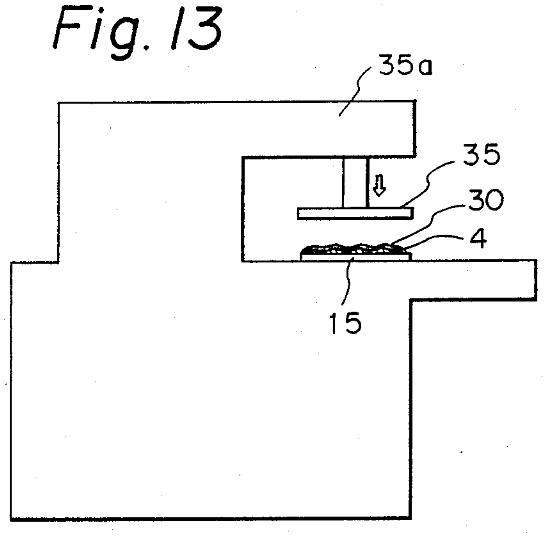
FIG. 13 is a schematic sectional view illustrating the fabricating step of the present invention as shown in Example 2.
Figure 14:
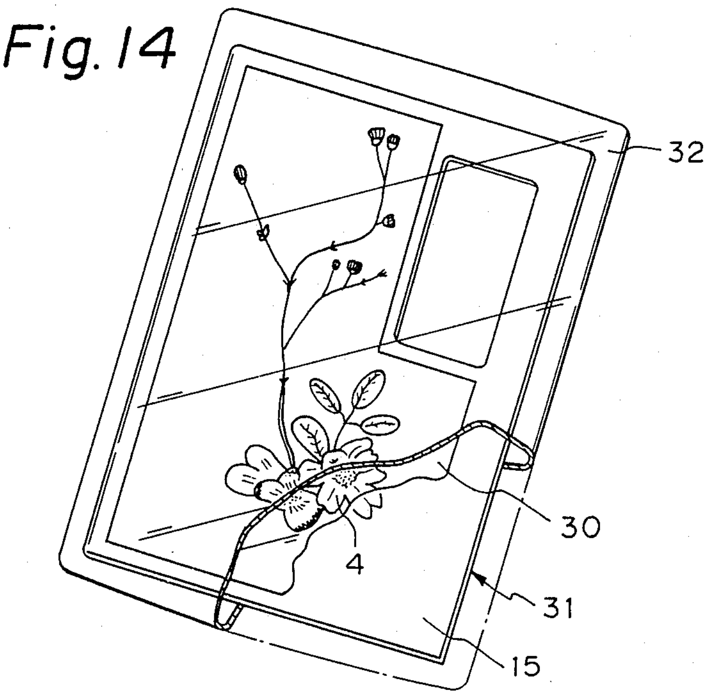
FIG. 14 is a perspective view of the postal folder including the press-dried plant produced according to the present invention.
Figure 15:
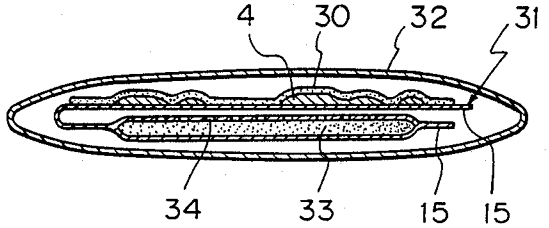
FIG. 15 is a sectional view of FIG. 14.

The example as shown in FIGS. 13 to 15 is a postal folder 31 for notepaper carrying the press-dried plant on the cover sheet prepared by the method wherein a translucent film 30 is adhered on the cover 15 and the plant 4 by heat contact bonding.

The postal folder 31 is put into an envelope, and stored in a transparent gas barrier bag 32. A desiccating agent 33 is provided within the card 15 of the back cover of the postal folder 31, and small vent holes 34 are provided on the surface thereof. In the case of the postal folder shown in FIGS. 6 and 7, the desiccating agent is not provided within the folder but is stored in the gas barrier bag containing another small bag including the desiccating agent.

The drying and storing steps of this example are performed as in Example 1.

Upon manufacturing the product, the gas barrier bag 12 as shown in FIG. 12 is broken and the dried plant is removed therefrom. The card 15 of the postal folder 31 containing the desiccating agent 33 with vent holes 34 is provided, and the plant is arranged in a desired pattern on the surface of the front cover of the folder 31. A breathing translucent thin film 30 of acetate (20–40 $\mu$m) is covered thereon, and further, a heat press plate 35 (25°–125° C.) of a pressing machine 35*a* is pushed down onto the translucent acetate film 30, the card 15 and the dried plant 4 to purge the air in the transverse direction and through the film, and thus effect adhesion without air remaining therein. FIGS. 14 and 15 illustrate the resulting article. Further, the transparent film 30 may be fused on the surfaces of the card 15 and the plant 4 to eliminate gas permeability and impart a gas barrier property. A transparent acetate may be used as the covering film. In this case, the heating temperature may be about 25° C. Further, the film may be transparent or translucent and the pressure sensitive adhesive may be coated or not coated on the underside.

Example 3

Figure 16:
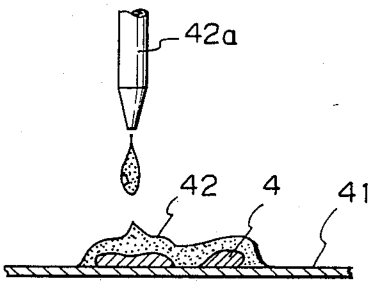
FIG. 16 is a schematic sectional view illustrating the fabricating step of the present invention as shown in Example 3.

This example as shown in FIG. 16 illustrates an embodiment of the invention set forth in claims 18–20.

Ten low-grade papers are stitched and dipped in a saturated aqueous solution of calcium chloride and dried at 100° C. to form a desiccating sheet 3 having a thickness of about 5 mm. On the desiccating sheet 3, plants are arranged and covered with a urethane mattress 5 with a thickness of about 2 mm to form a desiccating unit. About 20 units are stacked and pressed by mounting a weight of 40 kg, in a dehumidified room, without heating.

The plant was dried in about 3 or 4 days, which was less than a half of the time necessary in a conventional method using silica gel. The dried plant 4 had a bright color closer to that of the natural plant, in comparison with the silica method. The dried plant 4 was taken out, arranged on the mount 11, covered with a transparent film, and introduced into the transparent bag 12 having a low permeability of moisture and oxygen. The breathing bag 13 containing anhydrous magnesium sulfate, anhydrous calcium chloride or a mixture thereof was also introduced under the mount 11 in the transparent bag 12. By enclosing the dried plant in an atmosphere having a low moisture and a low oxygen concentration as above, discoloration of the plant due to air oxidation via water or self oxidation-reduction was considerably prevented. By this storing, a color and pattern similar to the natural color and pattern was maintained for 2–3 years. Upon manufacturing the product, the bag 12 was broken, and the dried plant 4 removed therefrom and placed on the surface 41 of the interior decoration, the card or the like. Then, unsaturated diethylacetal resin 42 was gently dripped from a supplying means 42*a* on the dried plant to fix it on the surface with a protective coating having a thickness of about 0.5–1 mm. Because the coating with the resin as above substantially completely blocked out ambient air from the dried plant, discoloration due to moisture absorption and oxidation was reduced.

Example 4

Figure 17:
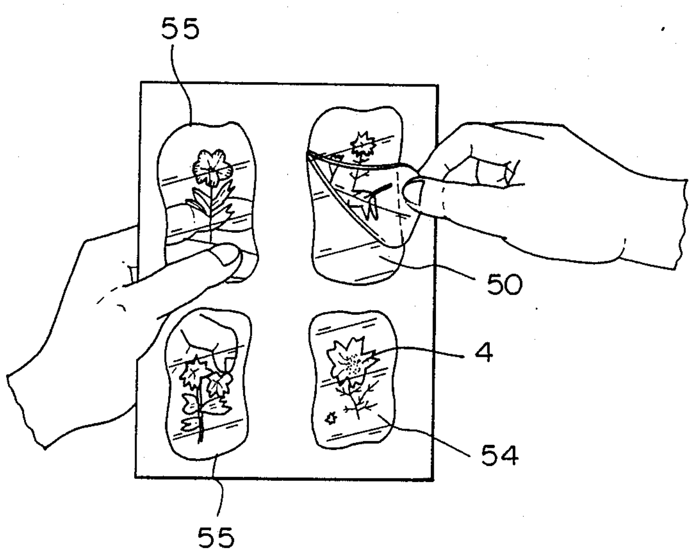
FIG. 17 is a plan view of the article produced according to the present invention as shown in Example 4.
Figure 18:
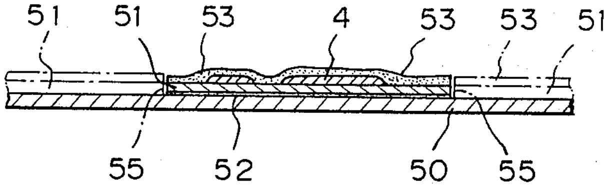
FIG. 18 is an enlarged sectional view of FIG. 17.

The press-dried plant article shown in FIGS. 17 and 18 is an embodiment of the invention set forth in claim 27, and corresponds to an improved article of the label of Example 1 as shown in FIGS. 11 and 12. In this example, a first film 50 having a white-tinted background and a transparent area 54 surrounding the dried plant was adhered to a second transparent film 51 with a weak pressure-sensitive adhesive 52, and the dried plant 4 was placed thereon and further covered with a third transparent film 53 having a pressure-sensitive adhesive coated on the underside thereof. As in Example 1, the third film was adhered with the pressure-sensitive adhesive by pressing with a rubber roll, while removing the air. Then, slits 55 were formed by cutting the second and third transparent films 51, 53 with a pressing edge along the peripheries of the transparent areas 54.

The label of this example was used, as in the label shown in FIGS. 11 and 12, by peeling away the second and third transparent films 51, 53 sandwiching the dried plant from the first transparent film 50. In the present example, the periphery of the dried plant was transparent at both sides, and thus the plant in the label could be observed from both sides. Further, the label could be adhered to general household ware, cloths, documents or the like and merged imperceptibly therewith, whereby the aesthetic value thereof was enhanced.

As explained above, according to the present invention, the press-dried plant can be produced in a state having a color and pattern similar to those of the natural plant, and maintained for a long time without discoloration. Further, because the dried plant can be stored for a long time, the article can be manufactured at any time, and thus the press-dried plant article can be produced regardless of the flowering or collecting time. Furthermore, the ratio of plants to the product obtained therefrom can be increased, and the commercial and aesthetic values can be considerably enhanced.

Although the present invention has been described with reference to specific embodiments, various changes and modifications obvious to those skilled in the art are deemed to be within the spirit, scope and concept of the invention.

I claim:

1. A method for producing an article including a press dried plant comprising the steps of:
   - interposing a picked plant between two flexible sheets impregnated with a desiccating agent or between one of said flexible sheets and a cushioning sheet;
   - drying the plant under pressure in a drying atmosphere;
   - removing the dried plant from between said sheets;
   - hermetically storing the dried plant in a bag of a gas barrier material, the bag containing a desiccating agent and an oxygen absorbing agent;
   - removing the plant from the bag shortly before producing the article carrying the press-dried plant;
   - placing the plant on a surface of a substrate, and;
   - forming a transparent or translucent overlayer on the plant so that air does not remain between the overlayer and the surface of the substrate.

2. A method according to claim 1, wherein the plant is a flower.

3. A method according to claim 1, wherein the desiccating agent with which the flexible sheet is impregnated is anhydrous magnesium sulfate, anhydrous calcium chloride, or a mixture thereof.

4. A method according to claim 1, wherein the flexible sheet is made of paper or fabric.

5. A method according to claim 1, wherein the cushioning sheet is made of a boxboard, cardboard, paperboard, fabric, or plastic foam.

6. A method according to claim 5, wherein the plastic foam sheet is a urethane mattress.

7. A method according to claim 1, wherein the substrate is a sheet, card, or general household ware.

8. A method according to claim 1, wherein the desiccating agent contained in the gas barrier bag is anhydrous magnesium sulfate, anhydrous calcium chloride, or a mixture thereof.

9. A method according to claim 1, wherein the oxygen absorbing agent contained in the gas barrier bag is an iron powder.

10. A method according to claim 1, wherein the picked plant is dried under heating.

11. A method according to claim 1, wherein the picked plant is dried in the form of a laminated piece made of more than one unit which comprises the picked plant and flexible sheets or cushioning sheet.

12. A method according to claim 11, wherein the picked plant is dried under heating.

13. A method according to claim 12, wherein a heating element is arranged on or under the laminated piece, or between the laminated pieces.

14. A method according to claim 1, wherein the overlayer is formed by covering the plant with a plastic film carrying an adhesive thereon and applying pressure thereon.

15. A method according to claim 14, wherein the pressure is applied under heating.

16. A method according to claim 14, wherein the overlayer has a gas barrier property.

17. A method according to claim 14, wherein the overlayer is made of a breathing plastic film, and the article carrying the press-dried plant is enveloped with a large bag of a gas barrier material.

18. A method according to claim 1, wherein the overlayer is formed by applying a plastic resin on the plant and drying same.

19. A method according to claim 18, wherein the resin is unsaturated diethylacetal.

20. A method according to claim 1, wherein the overlayer is formed by dripping a plastic resin on the plant and drying same.

21. A method for producing a label including a press-dried plant comprising the steps of
   - interposing a picked plant between two flexible sheets impregnated with a desiccating agent or between one of said flexible sheets and a cushioning sheet;
   - drying the plant under pressure in a drying atmosphere;
   - hermetically storing the dried plant in a bag of a gas barrier material, the bag containing a desiccating agent and an oxygen absorbing agent;
   - removing the plant from the bag shortly before producing the label carrying the press-dried plant;
   - placing the plant on a surface of a first self-adhesive film adhered to a surface of a temporary carrier;
   - covering the plant with a transparent or translucent second self-adhesive film;
   - applying pressure to bond the second film to the first film so that air does not remain therebetween, and;
   - cutting the first and second films to form a closed slit surrounding the plant.

22. A method according to claim 21, wherein the temporary carrier is a release sheet.

23. A method according to claim 21, wherein the temporary carrier is a transparent or translucent sheet.

* * * * *